United States Patent [19]

Slough et al.

[11] 4,130,791
[45] Dec. 19, 1978

[54] AUTOMATIC PIPE DEPTH LOCATOR

[75] Inventors: Carlton M. Slough, Spring, Tex.; Earl M. Romero, Broussard, La.

[73] Assignees: Texaco Inc., New York, N.Y.; The Texas Pipe Line Company, Bellaire, Tex.

[21] Appl. No.: 831,570

[22] Filed: Sep. 8, 1977

[51] Int. Cl.$^2$ .............................................. G01V 3/08
[52] U.S. Cl. ............................................ 324/3; 324/67
[58] Field of Search .................... 324/3, 6, 8, 67, 52; 340/258 C, 258 D

[56] References Cited

U.S. PATENT DOCUMENTS

| | | | |
|---|---|---|---|
| 1,526,391 | 2/1925 | Stewart | 324/67 |
| 2,238,072 | 4/1941 | Nelson et al. | 324/67 |
| 2,358,027 | 9/1944 | Penther et al. | 324/67 |
| 2,501,598 | 3/1950 | Eltenton et al. | 324/67 |
| 2,549,845 | 4/1951 | Mouzon et al. | 324/8 X |
| 3,889,179 | 6/1975 | Cutler | 324/67 X |
| 3,907,136 | 9/1975 | Christides et al. | 324/67 X |
| 3,988,663 | 10/1976 | Slough et al. | 324/67 X |

FOREIGN PATENT DOCUMENTS 526838  8/1976  U.S.S.R. ........................................ 324/3

*Primary Examiner*—Gerard R. Strecker
*Attorney, Agent, or Firm*—Thomas H. Whaley; Carl G. Ries; Henry C. Dearborn

[57] ABSTRACT

A locator for determining the depth of a pipeline which carries AC signals. The signals may be those induced by power lines, cathodic protection systems, or pumping equipment or other machinery connected to the pipeline. Also, specifically applied AC signals from a transmitter may be employed in the absence of the other signal sources.

The depth determining locator employs three directional detector coils in an elongated housing. Two coils are oriented transversely to the axis of the housing and are located as far apart as a preselected depth of the pipeline. The third coil is beside a forward one of the other two and is oriented at an angle, e.g. 45° to the transverse. There is electronic circuit means for timing the passage of the locator over the pipe between the two coils, and to measure the ratio of a constant (which represents the spacing of the two coils) times the time from the forward of the two coils to alignment with the third coil, divided by the time between the two coils. That ratio represents the depth of the pipe.

5 Claims, 5 Drawing Figures

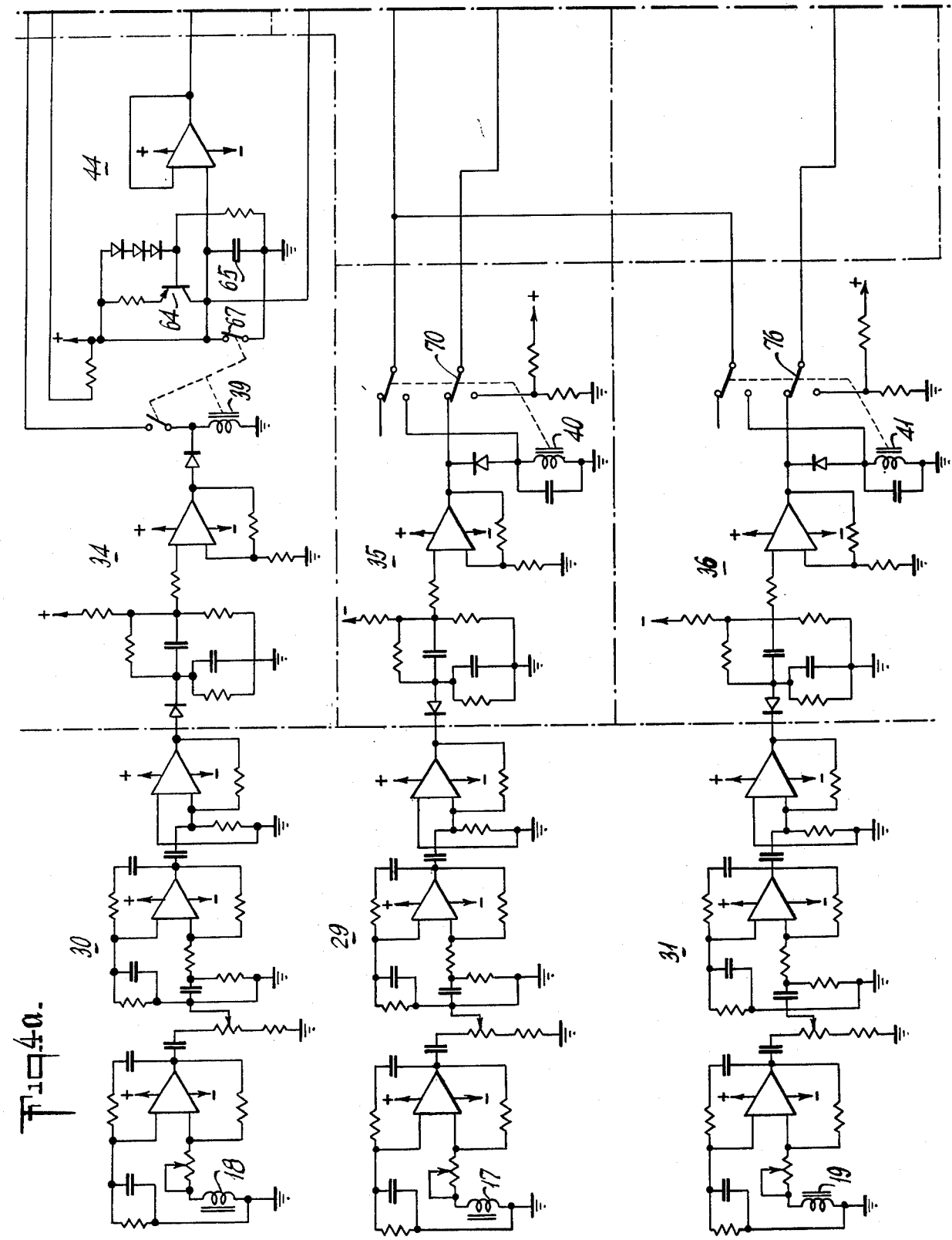

AUTOMATIC PIPE DEPTH LOCATOR

BACKGROUND OF THE INVENTION

1. Field of the Invention

This invention concerns a pipe depth locator in general. More specifically, the pipe locator according to this invention is a type that operates to detect an AC signal that emanates from the pipe or pipeline being measured.

2. Description of the Prior Art

A pipe locator has been described in U.S. Pat. No. 3,988,663 issued Oct. 26, 1976 and assigned to Texaco Inc. That patent teaches a locator instrument for manual operation in determining the subterranean location of a pipeline or the like which carries an AC signal thereon. However, while that patent suggested a technique for making a triangulation measurement to determine the depth of a pipe or pipeline beneath the surface, such operation was clearly a manual one. It would involve the moving of a single detection instrument so as to make a determination directionally from at least two locations, with appropriate measurements in relation thereto, so as to be able to compute the location, i.e. depth of the pipeline.

In addition, there is a prior U.S. Pat. No. 3,866,111 which has indicated a single instrument for detecting the output signals from an electromagnetic energy radiating body. It suggests the measurement of the amplitude of signals taken in three coordinate directions at a number of locations. The plots of such amplitudes then indicate the location of the energy radiating body.

Another depth measuring system has been disclosed in a U.S. Pat. No. 3,893,025. However, that system employs a pair of vertically spaced antennas and measures the comparative amplitudes of signals picked-up by these antennas. Then, the ratio of the amplitudes is a measure of the distance to the buried conductive structure.

It is an object of this invention to provide a unitary instrument which is compact and particularly adapted for use in determining the depth of a pipeline or the like, beneath the bottom of a body of water.

SUMMARY OF THE INVENTION

Briefly, the invention concerns a pipe depth locator for use in automatically determining the depth of a pipe beneath a predetermined datum level, said pipe having AC signals impressed thereon and said AC signals having a predetermined frequency. The locator comprises in combination an elongated housing adapted for being transported across said pipe location at said datum level. It also comprises at least three signal detectors located in said housing for detecting AC signals emanating from said pipe. The said detectors have directional characteristics for determining when said signals are emanating from a predetermined direction relative to said detectors. Two of said detectors are spaced apart a distance equal to a preselected depth of said pipe from said datum level and are oriented transversely to the plane of said datum level. The locator also comprises a third of said detectors which is located at the same place as one of said two detectors and is oriented at a predetermined angle relative to the plane of said datum level.

Again briefly, the invention concerns a pipe depth locator for use in automatically determining the depth of a pipe beneath a predetermined datum level. The said pipe has AC signals impressed thereon and said AC signals have a predetermined frequency. The locator comprises an elongated non-metallic housing adapted for being transported across said pipe location at said datum level. It also comprises three pick-up coils having ferromagnetic cores co-axially therewith, two of said coils being spaced apart a distance equal to a preselected depth of said pipe beneath said datum level and being oriented with said axis transverse to the plane of said datum level. The said third coil is located beside one of said two coils and is oriented with its axis at 45° from the transverse to said plane, and the locator comprises electronic circuit means connected to said pick-up coils for making said depth determination. The electronic means comprises a Wien bridge amplifier means connected to each of said pick-up coils, and a Schmitt trigger and relay connected to the output of each of said Wien bridge amplifier means. The circuit means also comprises a ramp generator activated by a reference one of said transversely oriented coils, and a sample-hold means connected to the relays of said other transversely oriented coil and said third coil. Said electronic circuit means also comprises means for multiplying and dividing the output from said sample-hold means to determine said pipe depth in accordance with the ratio of a constant times said sample-hold output from said third coil divided by said sample-hold output from said other transversely oriented coil.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIGS. 4a and 4b together illustrate a more detailed circuit diagram which shows the circuits employing electronic integrated circuit elements in a locator according to the invention.

DESCRIPTION OF THE PREFERRED EMBODIMENT

Figure 1:
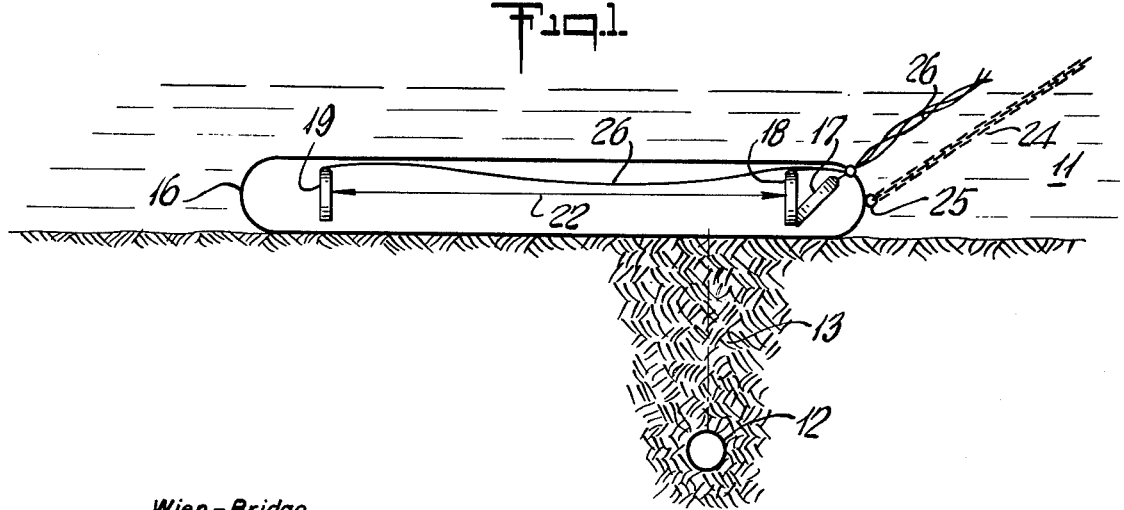
FIG. 1 is a schematic showing of an instrument according to the invention in position along the bottom of a body of water and passing over a pipe to have its depth measured.

FIG. 1 illustrates the probe portion of a locator according to the invention. This probe includes an elongated housing 16 which is shown resting on the bottom of a body of water 11 which may be a river or the like. A pipe 12 is shown in cross section as it lies buried in sub-soil 13 under the body of water 11.

The probe of the locator is made up of the elongated housing 16 that has three signal detectors 17, 18 and 19 mounted inside of the housing 16. The detectors 18 and 19 are oriented vertically when the housing in an horizontal position, as illustrated. It may be noted that the detector 17 is located beside the detector 18 and detector 17 is oriented at an angle of 45° aimed back from the forward end of the housing 16. The detectors 18 and 19 are located spaced a predetermined distance (see arrow 22) apart. As will appear more fully below, this distance 22 is designed to be equal to a preselected contemplated depth of the pipe 12 beneath the floor of the body of water 11.

At the forward end of the housing 16 there is a chain 24 attached to a bracket 25 for use in towing the probe along the bottom of body of water 11. There are electrical connectors 26 which go to the individual detectors 17, 18 and 19 and carry the signals generated in these detectors from the housing 16 to a boat (not shown) or other means for towing the housing 16 across the bottom of the body of water 11.

Each of the detectors 17, 18 and 19 are substantially like the detector coil-and-core structure described in the above mentioned U.S. Pat. No. 3,988,663. It will be appreciated that the connectors 26 are co-axial cables in order to eliminate any cross talk or pick-up of undesirable stray signals. Also, the housing 16 is made of nonmetallic material so that the AC signals being detected by the detector coils 17, 18 and 19 may pass readily therethrough.

Figure 2:
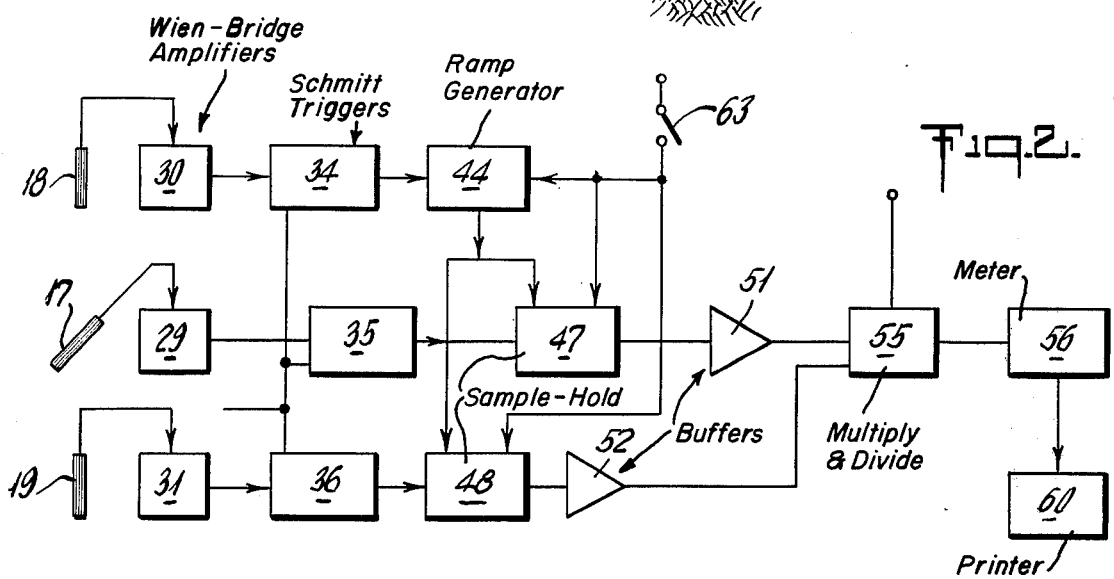
FIG. 2 is a block diagram illustrating a preferred circuit for use in connection with a pipe depth locator according to the invention.

As indicated in FIG. 2, each of the coils 17, 18 and 19 is connected to a Wien-bridge amplifier means 29, 30 and 31 respectively. These bridge amplifiers are identical and are each like the corresponding element, i.e. the Wien-bridge amplifier circuit, shown and described in the indicated U.S. Pat. No. 3,988,663. Consequently, a null or minimum signal is obtained from each of the detector coils when it is directed with its axis in alignment toward the pipe 12. The pipe is the source of AC signals being emitted therefrom.

Then, in order to make the depth determination in accordance with this invention, there are additional electronic circuit means connected to the outputs of the Wien-bridge amplifier elements 29, 30 and 31. Thus there are Schmitt triggers 34, 35 and 36 connected respectively to the pick up coil outputs from the related amplifiers 30, 29 and 31. These Schmitt triggers are arranged to trip upon a given minimum signal, so that when a null is detected the corresponding trigger will be tripped. There are individual relays 39, 40 and 41 illustrated in FIG. 4a, which are actuated when the respective triggers 34, 35 and 36 are tripped.

Connected to the output from the relay 39 of the trigger 34, there is a ramp generator 44 which has output connections to each of two sample-hold circuits 47 and 48. Outputs from the sample-hold circuits 47 and 48 go to a pair of buffers 51 and 52 respectively, which have outputs connected to a multiply-and-divide circuit 55. The output of circuit 55 provides an analog signal which may energize a meter 56 that is calibrated in terms of the depth in feet to the pipe 12, which depth is being measured. There may, of course, be a printer 60 connected to the meter 56 in order to make a permanent record of the analog signal which indicates the depth.

Figure 4B:
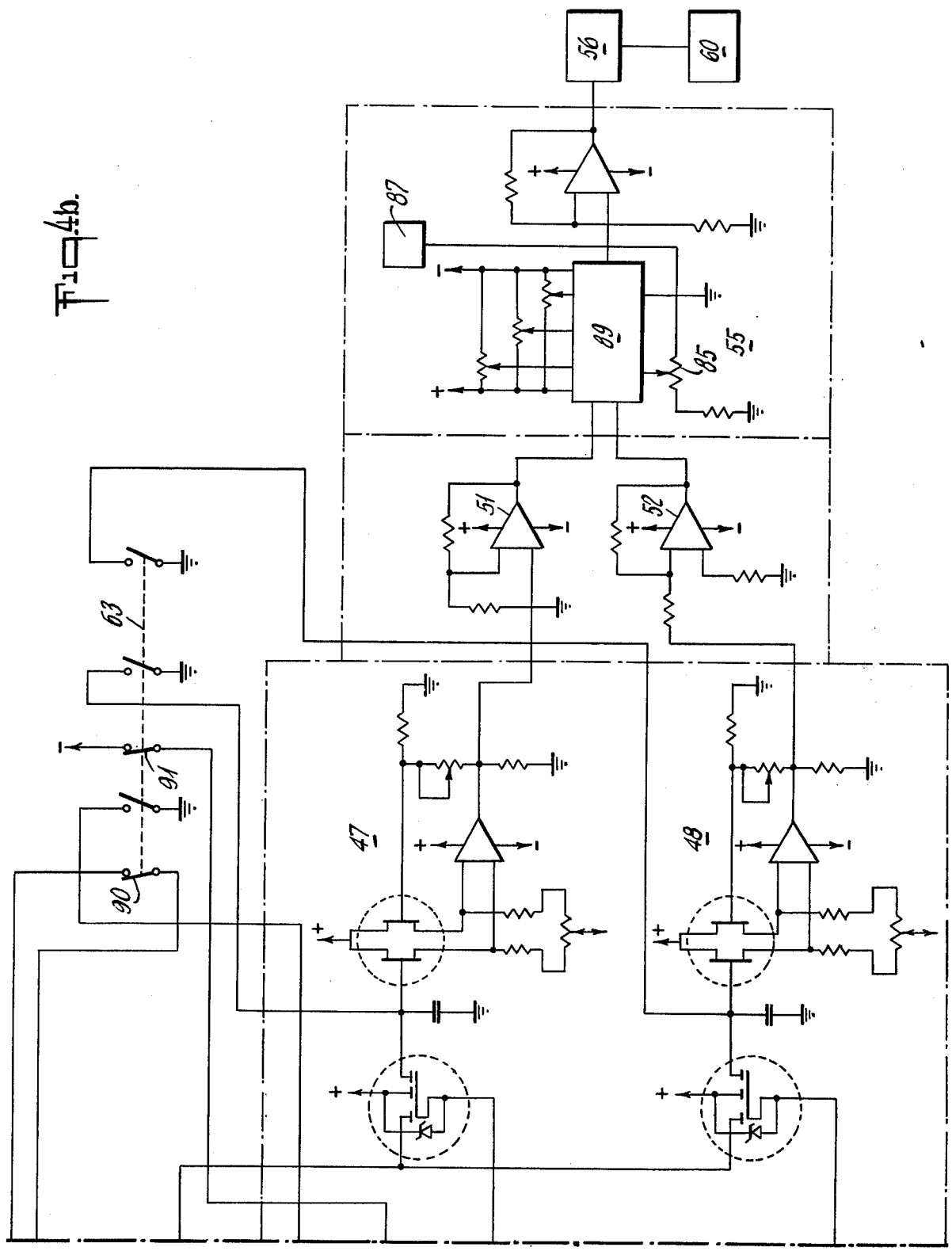

FIGS. 4a and 4b taken together illustrate a specific circuit diagram which shows elements that may be employed in carrying out the functions indicated by the block diagram of FIG. 2. The corresponding blocks indicated in FIG. 2 are shown in FIGS. 4a and 4b with dashed line separations, and the corresponding references numbers employed in FIG. 2 are indicated in FIGS. 4a and 4b. Thus, the pick-up coil 18 in FIG. 4a is connected to the input of the amplifier Wien-bridge unit 30, while pick-up coil 17 is connected to the input of the Wien-bridge amplifier unit 29. Similarly the pick-up coil 19 is connected to the input of the Wien-bridge unit 31.

The outputs of the Wien-bridge amplifier units 30, 29 and 31 are connected to the inputs of the Schmitt triggers 34, 35 and 36, respectively. These triggers include (at the outputs thereof) the relays 39, 40 and 41 respectively, as indicated above. These relays act to carry out the timing and the sample-hold functions which will be described in greater detail below. The Schmitt trigger unit 34 has its relay 39 connected to actuate the ramp generator 44, and generator 44 has the above indicated output circuit connections to the sample-hold circuits 47 and 48. These sample-hold circuits, in turn, have outputs connected to the buffers 51 and 52 which are between the sample-hold circuits 47 and 48 and the indicated multiply-divide circuit 55.

FIG. 2 has a schematic indication of a reset switch 63. In the more detailed showing, it is actually a multipole switch 63 as shown in FIG. 4b.

Operation

Figure 3:
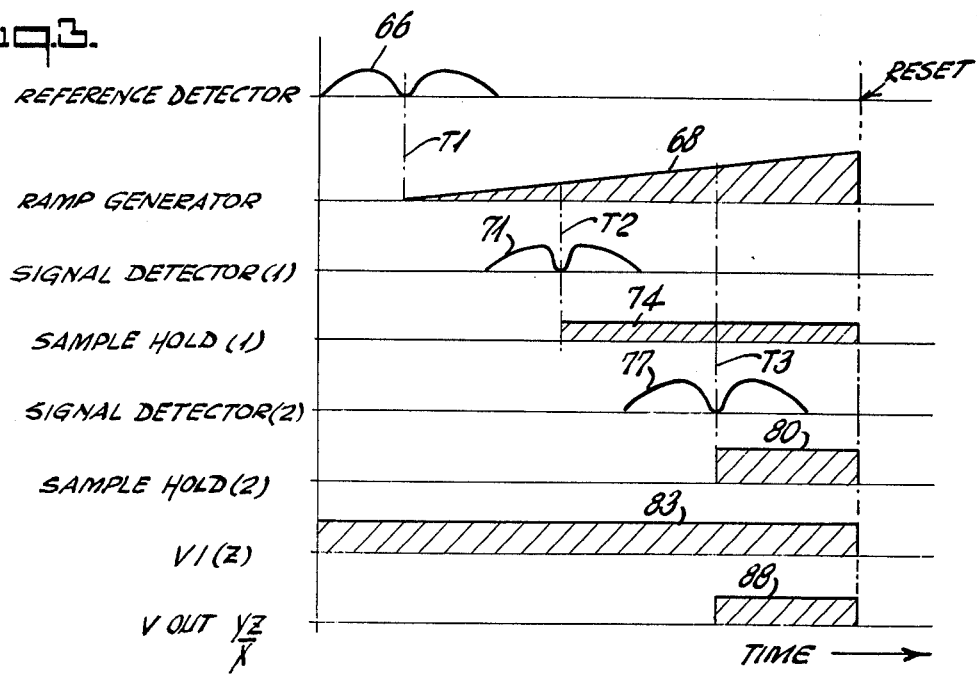
FIG. 3 is a graph illustrating the actions that take place in the circuits of the locator.

The operation of a locator may be explained with reference to FIG. 3. Individual signal conditions are represented along the ordinate of the FIG. 3 graph, as indicated by the captions, and the abscissa represents time.

As a depth measurement is made the probe housing 16 (FIG. 1) is towed along the bottom of the body of the water 11 and across the direction of the pipeline 12. The reset switch 63 is closed at the beginning of a run and this sets the ramp voltage at zero. It also readies the Schmitt triggers for actuation when null conditions take place.

As the reference detector 18 approaches the vertical above the pipe 12, the amplitude of the signal developed will vary, as indicated by a curve 66. It will be understood from the explanations provided in the above mentioned U.S. Pat. No. 3,988,663, that the signal amplitude will reach a minimum, or null signal condition at a time T1 which is when the coil 18 is directly in line with the pipe 12. This null output will trip the Schmitt trigger unit 34 and and so actuate its relay 39. The relay 39 has contacts 67 that are opened when the relay is actuated and that start the ramp generator 44 by commencing the charging of a capacitor 65 under control of a transistor 64. The ramp generator signal is indicated by a straight curve 68 shown in FIG. 3.

As the probe housing 16 continues to move along, the signal detector 17 will produce an output signal which varies like the signal produced by detector 18. However this occurs at a later time, as indicated by a curve 71 which is shown along the ordinate marked "Signal Detector (1)." This signal will dip to its null condition at a later time T2, which takes place when the detector 17 is aligned with the pipe 12. The second null signal will trip the Schmitt trigger 35 that is connected to the Wien-bridge amplifier unit 29, which in turn has received the detector signals from the coil 17.

When the Schmitt trigger relay unit 35 has been tripped, the relay 40 is actuated and the sample-hold circuit 47 will be actuated by the closing of contacts 70 on the relay 40, so as to retain the voltage of the ramp generator at the time T2. This sampled signal is indicated by a flat curve 74 which is held for the remainder of the operation, to determine the pipe depth.

It may be noted that since the distance 22 (see FIG. 1) between the detectors 18 and 19 is a preselected depth at which the pipe 12 might be located, the signal 71 (FIG. 3) from the detector 17 will occur somewhere on the ramp generator rise 68 before the detector 19 reaches its alignment over the pipe 12. Thus, the housing 16 continues along over the bottom of the body of water 12, the detector 19 will reach the position of vertical alignment over the pipe 12 last (so long as the pipe depth is less than preselected), and at that time its signal 77 will null, i.e. provide a minimum signal. This null will take place at a time T3, indicated in FIG. 3, and the null signal condition will trip the Schmitt trigger relay unit 36. Consequently, the relay 41 will be actuated and by closing contacts 76 (FIG. 4A), it will cause a transfer to the sample-hold circuit 48 of the voltage on the ramp generator at that time T3. Such voltage is represented by a flat curve 80 (FIG. 3) which holds and is passed on to the multiply-divide circuit 55, through the buffer 52. At the same time, a constant reference voltage which is indicated by a flat curve 83 (FIG. 3) is also applied to an input of the multiplier divider circuit 55. Such constant voltage is determined by a potentiometer 85 illustrated in FIG. 4b.

It will be understood that when the second sample-hold signal (represented by the curve 80) is received by the multiply-divide circuit 55 (at time T3) the circuit will carry out the multiplication and division so as to multiply the predetermined constant signal 83, by the first sample-hold signal 74 and divide the product by the second sample-hold signal 80. This provides an output that is proportaional to the depth of the pipe 12. Such output signal is represented by a flat curve 88 along the ordinate of FIG. 3, which carries the caption "V out YZ/X". Of course, this output may be calibrated in terms of the depth of the pipe 12. And, should the pipe depth be greater than the distance 22, the relative occurrence of the sample-hold signals will be reversed without changing the results.

It will be understood that this depth measurement is accomplished by moving the housing 16 at a constant speed along the bottom of the body of water 11 as it crosses the pipe 12, so that the distances involved are proportional to the time. Consequently, as indicated by the foregoing explanation referring to FIG. 3, the time measurement may be employed as being proportional to distance. Furthermore, since the system determines the ratio of the indicated ramp generator signal amplitudes, so long as the speed remains constant over the distance 22 (FIG. 1) or the pipe depth if greater, the determination will be accurate. Also, since the distance between the detectors 18 and 19 (or the pipe depth) is not extremely great, the speed change, if any, will be relatively minor and will not affect the accuracy of the measurement to a substantial degree.

It will be clear to anyone skilled in the art that the various elements indicated in the circuit diagram of FIGS. 4a and 4b, may be commercial items which are available as integrated circuits. For example, an integrated circuit unit 89 which is used in the multiply-divide circuit 55, may be one designated by the commercial identification AD 530. Also, it may be noted that the multiply-divide circuit 55 includes a reference voltage source 87 from which is derived the constant signal 83 (FIG. 3).

After reading of the depth of pipe 12 has been noted, and/or recorded by the printer 60, the reset switch 63 will be actuated. That will open normally closed contacts 90 and 91, which will release the relay 39 and both the relays 40 and 41, respectively. Then the system is reset and ready for another run. It may be noted that the normally closed contacts 90 are in a holding circuit for the relay 39, while similarly, the contacts 91 are in both of the holding circuits for relays 40 and 41.

It will be appreciated that a depth locator instrument according to this invention, may be employed to determine a distance from a datum level of any sort, so long as the instrument housing or probe is moved along such datum level. It is, of course, particularly well suited to the indicated use of measuring depths of pipe lines beneath bodies of water such as rivers or the like.

While a particular embodiment of the invention has been described in considerable detail in accordance with the applicable statutes, this is not to be taken as in any way limiting the invention but merely as being descriptive thereof.

We claim:

1. Pipe depth locator for use in automatically determining the depth of a pipe beneath a predetermined datum level, said pipe having AC signals impressed thereon and said AC signals having a predetermined frequency, comprising in combination
   an elongated housing adapted for being transported across said pipe location at said datum level,
   at least three pick up coils located in said housing for detecting said AC signals emanating from said pipe,
   said pick up coils having the axes thereof oriented for directional characteristics in order to determine when said signals are emanating from a predetermined direction relative thereto,
   two of said pick up coils being spaced apart a predetermined distance equal to a preselected depth of said pipe from said datum level and being oriented with the axes thereof transverse to the plane of said datum level,
   a third of said pick up coils being located at the same place as one of said two pick up coils and being oriented with the axis thereof at a predetermined angle relative to the plane of said datum level, and
   electric circuit means connected to said pick up coils,
   said circuit means comprising means for detecting null outputs from said pick up coils, and
   timing means for relating said null outputs from said two detectors to said null output from said third detector,
   all whereby said housing may be transported across said pipe location at said datum level at a constant speed in order to indicate when said null outputs have occurred so that said pipe depth may be determined.

2. Pipe depth locator according to claim 1, wherein said timing means comprises a ramp generator, and a pair of sample-hold means.

3. Pipe depth locator according to claim 5, wherein said circuit means also comprises means for multiplying and dividing the outputs from said sample-hold means.

4. Pipe depth locator according to claim 3, wherein said null detecting means comprises Schmitt triggers and relays, and
   first circuit means for connecting one of said relays to said ramp generator, and
   second circuit means for connecting the other relays to said sample-hold means.

5. Pipe depth locator for use in automatically determining the depth of a pipe beneath a predetermined datum level, said pipe having AC signals impressed thereon and said AC signals having a predetermined frequency, comprising
   an elongated non-metallic housing adapted for being transported across said pipe location at said datum level, three pick up coils having ferromagnetic cores coaxial therewith, two of said coils being spaced apart a distance equal to a preselected depth of said pipe beneath said datum level and being oriented with said axes transverse to the plane of said datum level, said third coil being located beside one of said two coils and being oriented with its axis at 45° from the transverse to said plane, and electronic circuit means connected to said pick up coils for making said depth determination, comprising Wien bridge amplifier means connected to each of said pick up coils, a Schmitt trigger and relay connected to the output of each of said Wien bridge amplifier means, a ramp generator actuated by a reference one of said transversely oriented coils, a sample-hold means connected to the relays of said other transversely oriented coil and said third coil, and means for multiplying and dividing the outputs from said sample-hold means to determine said pipe depth in accordance with the ratio of a constant times said sample-hold output from said third coil divided by said sample-hold output from said other transversely oriented coil.

* * * * *